US012272872B1

(12) United States Patent
Whyte et al.

(10) Patent No.: US 12,272,872 B1
(45) Date of Patent: Apr. 8, 2025

14
(54) MICROWAVE ANTENNA SYSTEMS WITH MULTIPLE WAVEGUIDE SEGMENTS

(71) Applicant: Outdoor Wireless Networks LLC, Claremont, NC (US)

(72) Inventors: Griogair Whyte, Larbert (GB); ZiCheng Zu, Jiangsu (CN); Wenxing Tang, Milothian (GB)

(73) Assignee: Outdoor Wireless Networks LLC, Richardson, TX (US)

( * ) Notice: Subject to any disclaimer, the term of this patent is extended or adjusted under 35 U.S.C. 154(b) by 0 days.

(21) Appl. No.: 18/859,464

(22) PCT Filed: Apr. 27, 2023

(86) PCT No.: PCT/US2023/066282
§ 371 (c)(1),
(2) Date: Oct. 23, 2024

(87) PCT Pub. No.: WO2023/212631
PCT Pub. Date: Nov. 2, 2023

(30) Foreign Application Priority Data

Apr. 29, 2022 (CN) ......................... 202210493918.9

(51) Int. Cl.
*H01Q 19/13* (2006.01)
*H01Q 13/06* (2006.01)

(52) U.S. Cl.
CPC ........... *H01Q 13/065* (2013.01); *H01Q 19/13* (2013.01)

(58) Field of Classification Search
CPC ...... H01Q 13/065; H01Q 19/13; H01Q 19/15; H01Q 5/55; H01Q 13/00
See application file for complete search history.

(56) References Cited

U.S. PATENT DOCUMENTS

| | | | | |
|---|---|---|---|---|
| 6,329,957 | B1 * | 12/2001 | Shea | H01Q 5/47 343/756 |
| 7,592,887 | B2 | 9/2009 | Chao et al. | |
| 10,165,630 | B2 * | 12/2018 | Okoniewski | H05B 6/708 |
| 2002/0097116 | A1 | 7/2002 | Mack et al. | |
| 2017/0229752 | A1 | 8/2017 | Kirino et al. | |
| 2018/0323490 | A1 | 11/2018 | Harp et al. | |

(Continued)

OTHER PUBLICATIONS

"International Search Report and Written Opinion of the International Search Report", International Application No. PCT/US2023/066282, Sep. 19, 2023, 21 pp.

*Primary Examiner* — Awat M Salih
(74) *Attorney, Agent, or Firm* — Myers Bigel, P.A.

(57) ABSTRACT

A microwave antenna assembly and methods of using and/or assembling the same, which may mitigate problems related to tolerance and tolerance stackup. For example, the microwave antenna assembly may include a waveguide that includes a first waveguide component and a second waveguide component; and a mechanical connection configured to couple the first waveguide component and the second waveguide component and configured to force a first gap between the first waveguide component and the second waveguide component. A spanning distance of the first gap may be selected to reduce a size of a second gap due to tolerances within the microwave antenna assembly between the waveguide and radio equipment. The radio equipment may be configured to provide the waveguide with microwave radiofrequency (RF) signals.

21 Claims, 8 Drawing Sheets

(56) References Cited

U.S. PATENT DOCUMENTS

| | | | | |
|---|---|---|---|---|
| 2019/0089065 | A1* | 3/2019 | Sikes | H01Q 21/005 |
| 2020/0036088 | A1 | 1/2020 | Bongard et al. | |
| 2020/0313296 | A1 | 10/2020 | Mitchelson et al. | |

* cited by examiner

MICROWAVE ANTENNA SYSTEMS WITH MULTIPLE WAVEGUIDE SEGMENTS

CROSS-REFERENCE TO RELATED APPLICATIONS

The present application is a 35 U.S.C. § 371 national stage application of PCT Application No. PCT/US2023/066282, filed on Apr. 27, 2023, which itself claims the benefit of priority to Chinese Patent Application No. 202210493918.9, filed on Apr. 29, 2022, with the China National Intellectual Property Administration, and the entire contents of the above-identified applications are incorporated by reference as if set forth herein.

TECHNICAL FIELD

The present disclosure relates generally to microwave communication and, more particularly, to microwave antenna systems.

BACKGROUND

Microwave transmission refers to the transmission of information or energy by electromagnetic waves whose wavelengths are measured in units of centimeters. These electromagnetic waves are called microwaves. The "microwave" portion of the radio spectrum ranges across a frequency band of approximately 1.0 GHz to approximately 300 GHz. These frequencies correspond to wavelengths in a range of approximately 30 centimeters to 0.1 centimeters.

Microwave communication systems may be used for point-to-point communications because the small wavelength of the electromagnetic waves may allow relatively small sized antennas to direct the electromagnetic waves into narrow beams, which may be pointed directly at a receiving antenna. This ability to form narrow antenna beams may allow nearby microwave communications equipment to use the same frequencies without interfering with each other as might occur in lower frequency electromagnetic wave communication systems. In addition, the high frequency of microwaves may give the microwave band a relatively large capacity for carrying information, as the microwave band has a bandwidth approximately thirty times the bandwidth of the entirety of the radio spectrum that is at frequencies below the microwave band. Microwave communications systems, however, are limited to line of sight propagation as electromagnetic waves at microwave frequencies cannot pass around hills, mountains, structures, or other obstacles in the way that lower frequency radio waves can.

Parabolic reflector antennas are often used to transmit and receive microwave signals. FIG. 1 is a partially-exploded, rear perspective view of a conventional microwave antenna system 10 that uses a parabolic reflector antenna. As shown in FIG. 1, the antenna system 10 includes a parabolic reflector antenna 20, a waveguide assembly 30, and a hub 50. The parabolic reflector antenna 20 may comprise, for example, a dish-shaped structure that is formed of metal or that has a metal inner surface (the inner metal surface of antenna 20 is not visible in FIG. 1). A feed bore 22 in the form of an opening is provided at the middle (bottom) of the parabolic reflector antenna 20.

The hub 50 may be used to mount the parabolic reflector antenna 20 on a mounting structure (not shown) such as a pole, antenna tower, building or the like. The hub 50 may be mounted on the rear surface of the parabolic reflector antenna 20 by, for example, mounting screws. The hub 50 may include a hub adapter 52. The hub adapter 52 may be received within the feed bore 22.

The feed assembly 30 may include a waveguide boom 32, a sub-reflector 40, a low-loss dielectric block 34, and a transition element 54. The transition element 54 may be within the hub adapter 52. The transition element 54 may be designed to efficiently launch RF signals received from, for example, a radio (not shown) into the other components of the feed assembly 30. For example, the transition element 54 may comprise a waveguide transition (e.g., a rectangular-to-circular transition) that is impedance matched for a specific frequency band.

The transition element 54 includes a bore 56 that receives the waveguide boom 32. The waveguide boom 32 may have a waveguide therein (e.g., a waveguide having a circular cross-sectional shape) and may be substantially tubular. The waveguide boom 32 may be formed of a metal such as, for example, aluminum. When the waveguide boom 32 is mounted in the hub adapter 52 and the hub adapter 52 is received within the feed bore 22, a base of the waveguide boom 32 may be proximal to the feed bore 22, and a distal end of the waveguide boom 32 may be in the interior of the parabolic reflector antenna 20.

The low-loss dielectric block 34 may be inserted into the distal end of the waveguide 32. The inserted end of the low-loss dielectric block 34 may have, for example, a stepped generally cone-like shape. The sub-reflector 40 may be mounted on the distal end of the dielectric block 34. In some cases, the sub-reflector 40 may be a metal layer that is sprayed, brushed, plated, or otherwise formed on a surface of the dielectric block 34. In other cases, the sub-reflector 40 may comprise a separate element that is attached to the dielectric block 34. The sub-reflector 40 is typically made of metal and is positioned at a focal point of the parabolic reflector antenna 20. The sub-reflector 40 is designed to reflect microwave energy emitted from the waveguide boom 32 onto the interior of the parabolic reflector antenna 20, and to reflect and focus microwave energy that is incident on the parabolic reflector antenna 20 into the distal end of the waveguide boom 32.

SUMMARY

Some aspects of the present disclosure provide microwave antenna assemblies. For example, a microwave antenna assembly may include a waveguide that includes a first waveguide component and a second waveguide component; and a mechanical connection configured to couple the first waveguide component and the second waveguide component and configured to force a first gap between the first waveguide component and the second waveguide component. A spanning distance of the first gap may be selected to reduce a size of a second gap due to tolerances within the microwave antenna assembly between the waveguide and radio equipment. The radio equipment may be configured to provide the waveguide with microwave radiofrequency (RF) signals.

Another example of a microwave antenna assembly provided herein may include a waveguide arrangeable between radio equipment and a parabolic reflector antenna, where the waveguide includes a first waveguide portion and a second waveguide portion; a first gap between the first waveguide portion and the second waveguide portion; and a first radiofrequency (RF) choke concentric with the first gap. A spanning distance of the first gap may be selected to reduce a size of a second gap due to tolerances within the microwave antenna assembly in a direction of signal propagation.

Another example of a microwave antenna assembly provided herein may include a waveguide boom arrangeable between radio equipment and a parabolic reflector antenna; a first gap between the waveguide boom and a waveguide component different than the waveguide boom; and a first radiofrequency (RF) choke concentric with the first gap, where the first RF choke is at an undercut region formed in an end of the waveguide boom.

Some aspects of the present disclosure provide methods of using and/or assembling microwave antenna equipment, antenna equipment, and/or microwave antenna assemblies. For example a method may include: providing a plurality of components that form a waveguide between an antenna and radio equipment, each component having a tolerance associated therewith, the tolerances summing to a total tolerance stack; and forcing, via a mechanical connection, a gap between first and second components of the plurality components, wherein a location and a spanning distance of the gap are selected to divide the total tolerance stack into a first tolerance stack and a second tolerance stack.

The present disclosure is not limited to those aspects provided above, and other aspects will be apparent in view of the description of the inventive concepts provided herein and the accompanying drawings.

DETAILED DESCRIPTION

Figure 1:
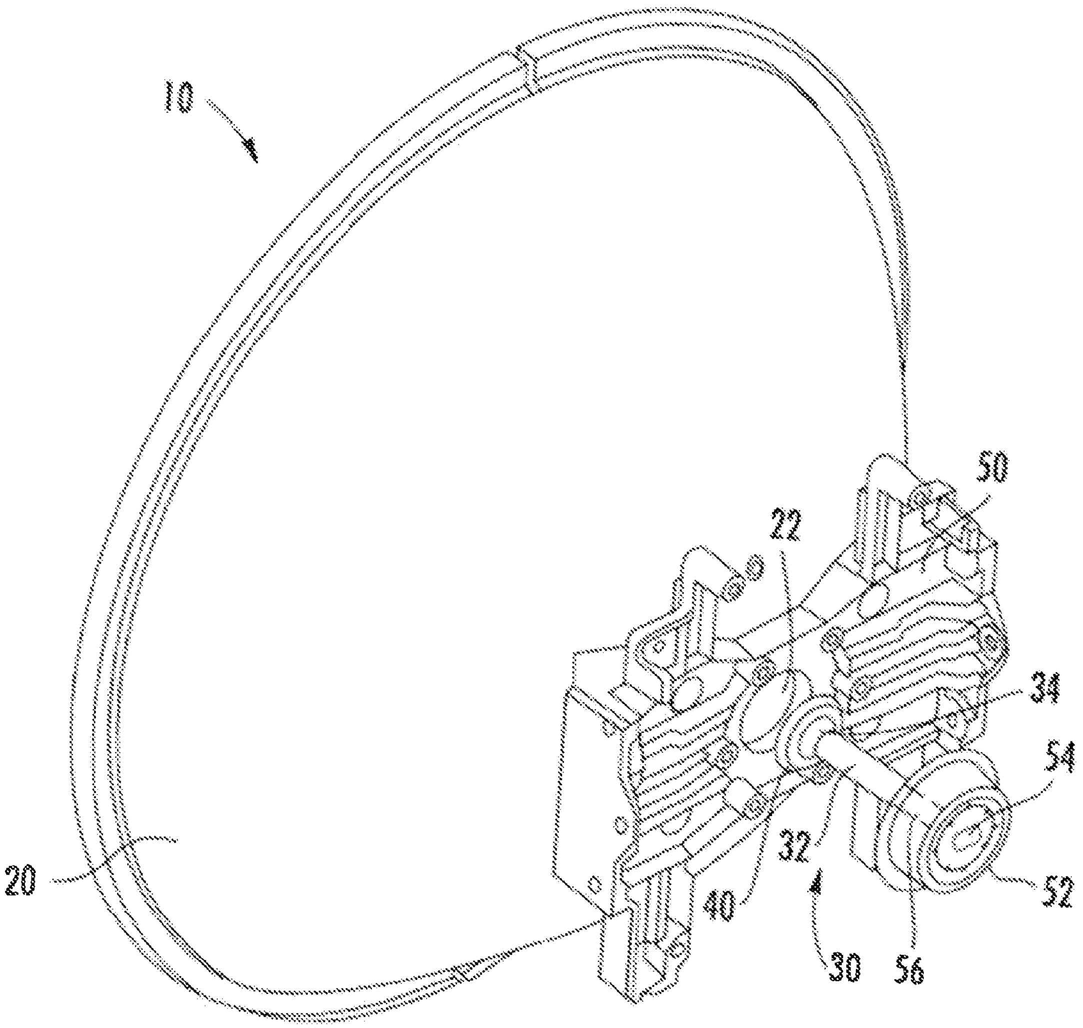
FIG. 1 is a partially-exploded, rear perspective view of a conventional microwave antenna system.
Figure 2:
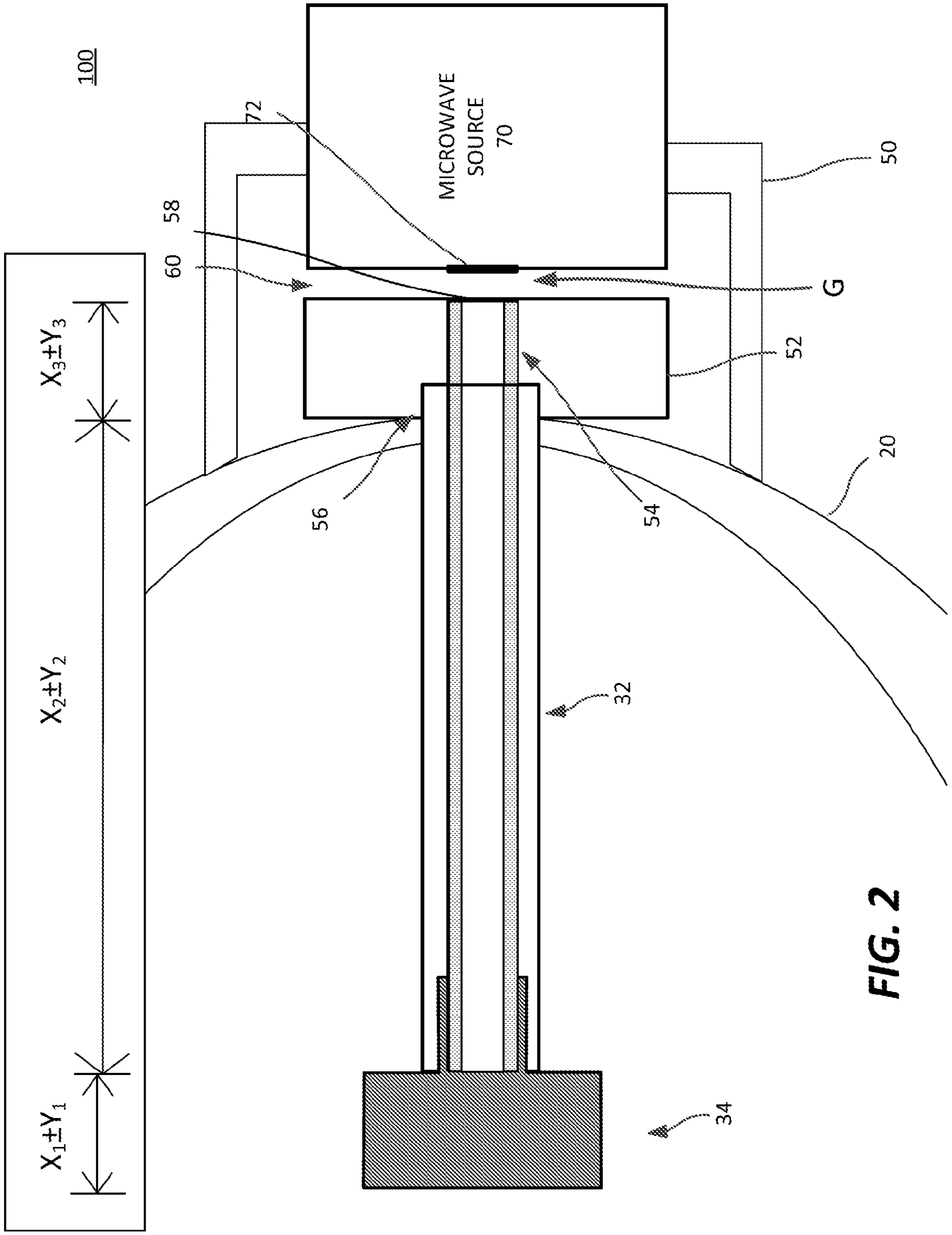
FIG. 2 is a side sectional view of a coaxial feed assembly of a conventional microwave antenna system.

FIG. 2 is a side sectional view of a coaxial feed system 100 of a conventional microwave antenna system that includes a coaxial feed assembly, such as the coaxial feed assembly 30 of FIG. 1. As discussed above, a feed bore in the form of an opening (not shown in FIG. 2) may be provided in a dish-shaped antenna (also not shown in FIG. 2). A component of the coaxial feed system 100, such as the hub adapter 52, may be received within the feed bore, such that the waveguide boom 32, low-loss dielectric block 34, and a sub-reflector attached to the low-loss dielectric block are within an interior of the parabolic reflector antenna, and an interface port 58 of the feed assembly 100, which is at an end of the transition element 54 opposite from the waveguide boom 32, is outside of the parabolic reflector antenna and proximal to a microwave source 70.

The microwave source 70 may be or may include one or more radios. In some embodiments, the microwave source 70 may include additional elements such as, for example, an orthomode transducer ("OMT") that connects a pair of radios that transmit orthogonally polarized signals to the coaxial feed assembly. An interface port 72 of the microwave source 70 may be aligned coaxially with the interface port 58 of the transition element 56.

Ideally, to avoid performance loss in the transmission of signals between the microwave source 70 and the transition element 56, the components would be butted together with perfect or near-perfect ohmic contact, resulting in at most negligible reflections and negligible signal leakage. However, such an ohmic contact would require alignment and surface contact that would be both difficult to achieve and maintain in real-world conditions. For example, the microwave equipment of FIGS. 1 and 2 may be installed at a site subject to relatively harsh environmental conditions, such as transient wind load. If the microwave source 70 directly abuts or contacts the transition element 54, damage to either may occur during a wind event (e.g., due to forces acting on the equipment that results in collisions). The microwave equipment may also be subject to large temperature changes that can result in contraction and expansion of the equipment, and damage may occur resulting from these temperature changes.

To avoid damage to the microwave source 70 and/or the components of the microwave antenna system 10, there may be a site or customer requirement that there be no hard contact or flush mounting between the microwave source 70 and the hub adapter 52. In other words, to avoid damage, the mounting elements 60 may be configured to produce an unavoidable gap G between the interface port 72 of the microwave source 70 and the interface port 58 of the transition element 54. This unavoidable gap G, if sufficiently large, may result in degraded performance of the microwave system, for example due to microwave signals from the microwave source 70 not being received at the port 58, and instead propagating into free space. In contrast, the transition element 56, waveguide boom 32, and dielectric block 34 are typically manufactured to have no gaps and direct abutment therebetween to improve performance of the coaxial feed assembly.

Managing and designing microwave systems with a sufficiently small unavoidable gap G that nevertheless have acceptable microwave performance is made difficult in part due to two complications. A first complication is the concept of tolerance, which is present in all real-world mechanical structures. Tolerance recognizes that there may be some deviation in a dimension, property, or condition of a component resulting from manufacturing processes. For example, each component of the coaxial feed assembly 30 (e.g., the transition element 54, the waveguide boom 32, the low-loss dielectric block 34) may have a specified linear length $X_i$ in a first direction that is parallel with the direction of microwave communication. In addition, each component may have a stated tolerance $Y_i$ that the component may deviate from the specified length while still being compliant with the specification. In other words, the length of the waveguide boom 32 in compliance with a specification thereof may be in the range $X_2$+/−$Y_2$. Waveguide booms 32 having lengths outside this specified range are not in compliance with the specified length. The tightness of the tolerance may be increased, and the size of the range (i.e., the value of Y) may be reduced, albeit typically at increased cost or complexity in manufacturing or at an increased rejection rate of manufactured components.

A second complication, related to tolerance, is that of tolerance stackup, or a cumulation or sum of the tolerances $Y_i$ in the first direction. Stated differently, each of the tolerances $Y_i$ shown in FIG. 2 (as well as tolerances of other components in the coaxial feed assembly 30 not shown in the figure) may be summed together to find a worse case scenario, e.g., $Y_1+Y_2+Y_3$. The total length of the coaxial feed assembly 30 may therefore be off by this summed amount in either direction and still have each component thereof be acceptable and in compliance with the stated length. As may be seen, if each component is in fact manufactured at its minimum compliant length, the size of the gap G may be $(Y_1+Y_2+Y_3)$ greater than if each component is at its nominal length X. Alternatively, if each component is in fact manufactured at its maximum compliant length, the size of the gap G may be $(Y_1+Y_2+Y_3)$ less than if each component is at its nominal length X. Stated differently, in a worst case, the size of the gap G may be either $(Y_1+Y_2+Y_3)$ less than or $(Y_1+Y_2+Y_3)$ greater than the nominal gap. Depending on values for each of $X_{1-3}$ and $Y_{1-3}$, a deviation in the size of the gap G may be relatively quite large and may further degrade performance.

It is known to use flanges having choke arrangements at waveguide joints, as discussed in U.S. Pat. No. 7,592,887 the entire content of which is incorporated herein by reference. For example, a circular groove (which can be formed, for example, in the back face of the hub adapter 52), having both a depth and a radius of a quarter wavelength (i.e., λ/4) may be coaxial with the interface port 58. Such a groove acts as an RF choke to cancel signals via destructive interference, thereby improving RF performance. However, when the size of the gap G is sufficiently large, or if during design it becomes evident that the gap G may be sufficiently large in view of the cumulative tolerance, a single groove may be insufficient. Thus, one or more additional grooves having a larger radius (e.g., three-quarter wavelengths (i.e., 3λ/4)) may be used. This results in an increase in both the manufacturing complexity of the component, as well as an increase in the overall size of the transition element 54 to accommodate the additional choke The present disclosure is based on the recognition that, rather than providing these additional chokes at the gap G, one way to reduce the size of the gap G may be to split up the gap into multiple smaller gaps throughout the coaxial feed assembly. Each gap may accommodate a portion of the tolerance stack up. While more than one gap is provided, the size of the gaps may be reduced. If provided in a controlled manner, such smaller gaps may improve performance of the microwave antenna system, because the cumulative degradation to RF performance caused by the smaller gaps may be less than the degradation in RF performance caused by one large gap.

Figure 3:
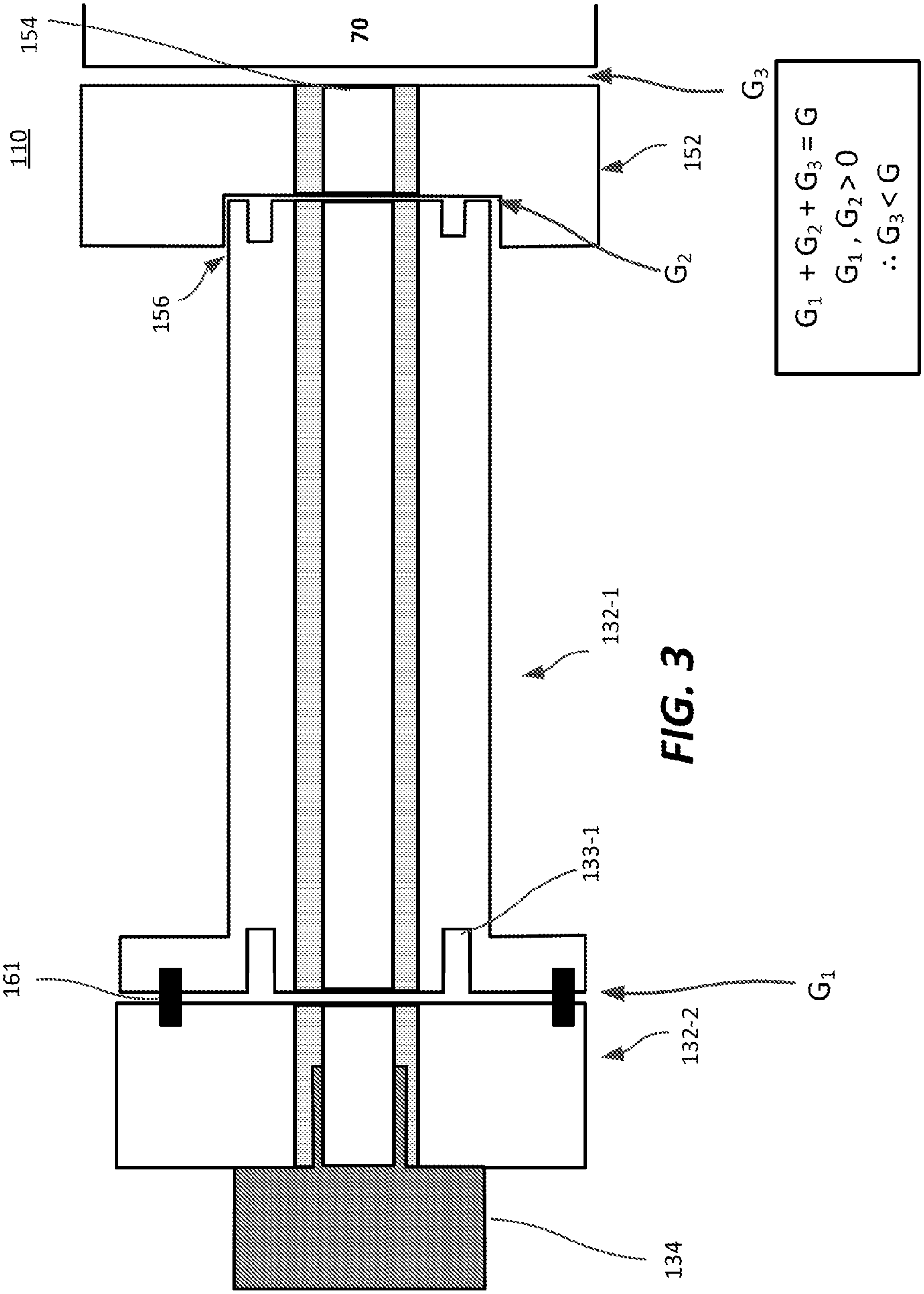
FIG. 3 is a side sectional view of a coaxial feed assembly of a microwave antenna system according to the present disclosure.

FIG. 3 is a side sectional view of a coaxial feed assembly 110 of a microwave antenna system according to the present disclosure. The coaxial feed assembly 110 may include a dielectric block 134, a waveguide boom 132, and a hub adapter 152, which may include a transition element 154 therein. The hub adapter 152 may be received within a feed bore of a parabolic reflector antenna (not shown).

The transition element 154 may include a bore 156 that receives the waveguide boom 132. The waveguide boom 132 may have at least two components or sections 132-1 and 132-2 that are coupled together via mounting components 161. The waveguide boom 132 may have, for example, a circular cross-sectional shape and be substantially tubular. The waveguide boom 132 may be formed of a metal such as, for example, aluminum. When the waveguide boom 132 or a section thereof is mounted in the hub adapter 152 and the hub adapter 152 is received within the feed bore, a base of the waveguide boom 132 may be proximal the feed bore, and a distal end of the waveguide boom 132 may be in the interior of the parabolic reflector antenna. The dielectric block 134 may be coupled to or inserted into the waveguide boom 132 in a manner similar to that discussed above.

In contrast to FIG. 2, the components of the coaxial feed assembly 110 may be coupled (e.g., via mounting components 161) such that gaps $G_1$ and $G_2$ are forced respectively between the first waveguide component 132-1 and the second waveguide component 132-2, and between the waveguide boom 132 and the transition element 154. Accordingly, FIG. 3 provides a microwave antenna assembly that includes a coaxial feed assembly with a first waveguide component 132-1, a second waveguide component 132-2; and a mechanical connection (e.g., mounting components 161) configured to couple the first waveguide component and the second waveguide component and configured to force a gap $G_1$ between the first waveguide and the second waveguide. A spanning distance of the gap $G_1$ may be selected to reduce, or in some cases close or eliminate, a size of a gap $G_3$ that results from tolerances or from a cumulative tolerance within the microwave antenna assembly in a first direction. Stated differently, a spanning distance of the gap $G_1$ may be selected to mitigate and/or eliminate a buildup of tolerances at a location within the microwave antenna assembly.

Coaxial chokes 133 may be provided in the first section 132-1 of the waveguide boom 132, the second section 132-2 of the waveguide boom 132, and/or the transition element 152. As described above, the coaxial chokes 133 may be grooves having a size and a depth corresponding to the wavelength of a transmission frequency of the microwave system.

As can be seen from comparison of FIG. 2 with FIG. 3, the unavoidable gap G in FIG. 2 has been reduced in size to a smaller gap $G_3$, in view of the presence of gaps $G_1$ and $G_2$. In some embodiments, the size of the smaller gap $G_3$ may be zero or negligible. By providing a gap $G_1$ between first and second components 132-1 and 132-2 of the waveguide boom 132, a tolerance stack or cumulative tolerance of the coaxial feed assembly 110 may be divided into a first tolerance stack or cumulative tolerance (e.g., components in the feed assembly to the left of the gap $G_1$) and a second tolerance stack or cumulative tolerance (e.g., components in the feed assembly to the right of the gap $G_1$).

Figure 4:
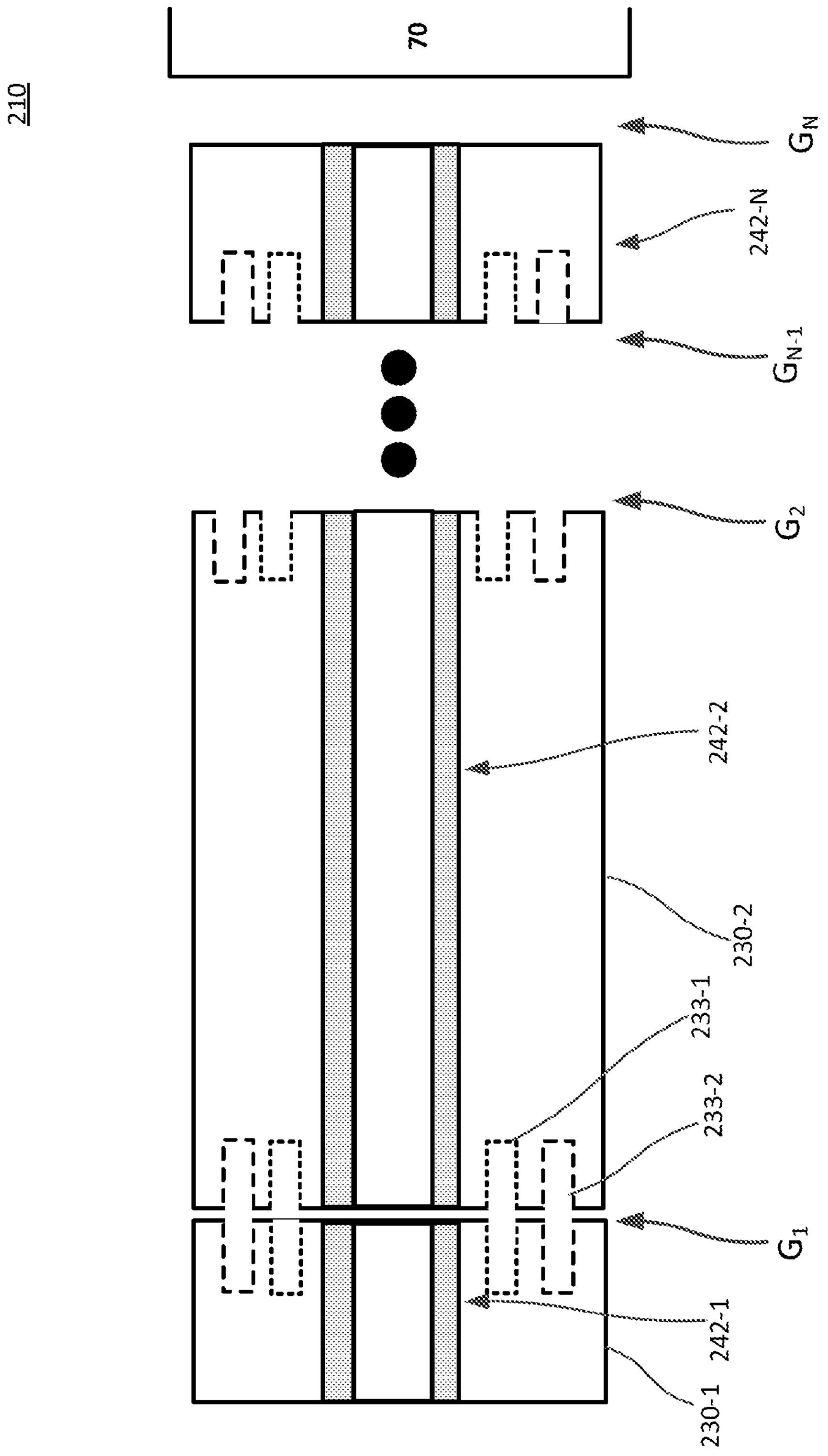
FIG. 4 is a side sectional view of a coaxial feed assembly of a microwave antenna system according to the present disclosure.

The inventive concepts described above with reference to FIG. 3 are considered more generically with reference to FIG. 4, which is a side sectional view of a coaxial feed assembly 210 of a microwave antenna system according to the present disclosure. The coaxial feed assembly 210 may include a plurality of waveguide components 230, each having therein a portion of a waveguide 242 between a microwave source 70 and a reflector of an antenna (not shown). The waveguide components 230 may be, e.g., a waveguide boom, a portion of a waveguide boom, or a waveguide transition. In some embodiments, a waveguide component 230 may have a first cross-section at a first end thereof (e.g., a circular or elliptical cross section) and a second cross-section at a second end thereof (e.g., a square or rectangular cross-section) and may transition from the first cross-section to the second cross-section over the length of the waveguide component.

The waveguide 242 may be segmented into a plurality of portions 242-1, 242-2, . . . , 242-N, due to gaps $G_1$, $G_2$, . . . , $G_{N-1}$ between the components of the coaxial feed assembly 210. The spanning distances of each of the gaps $G_1, G_2, \ldots, G_{N-1}$ in the first direction (e.g., the direction of microwave signal propagation within the waveguide 242) may be selected to reduce a size of a gap $G_N$ that results from tolerances or from a cumulative tolerance within the microwave antenna assembly in a first direction. The gap $G_N$ is between the microwave source 70 and an end of the waveguide 242 proximal to the microwave source 70.

Each gap $G_1, G_2, \ldots, G_{N-1}$ may have one or more than one concentric or coaxial choke 233 present in either a first waveguide component 230 on a first side of the gap $G_1, G_2, \ldots, G_{N-1}$, and/or in a second waveguide component 230 on a second side of the gap $G_1, G_2, \ldots, G_{N-1}$. Each of the coaxial chokes 133 may be grooves having a size and a depth corresponding to the wavelength of a transmission frequency of the microwave antenna system.

Figure 5:
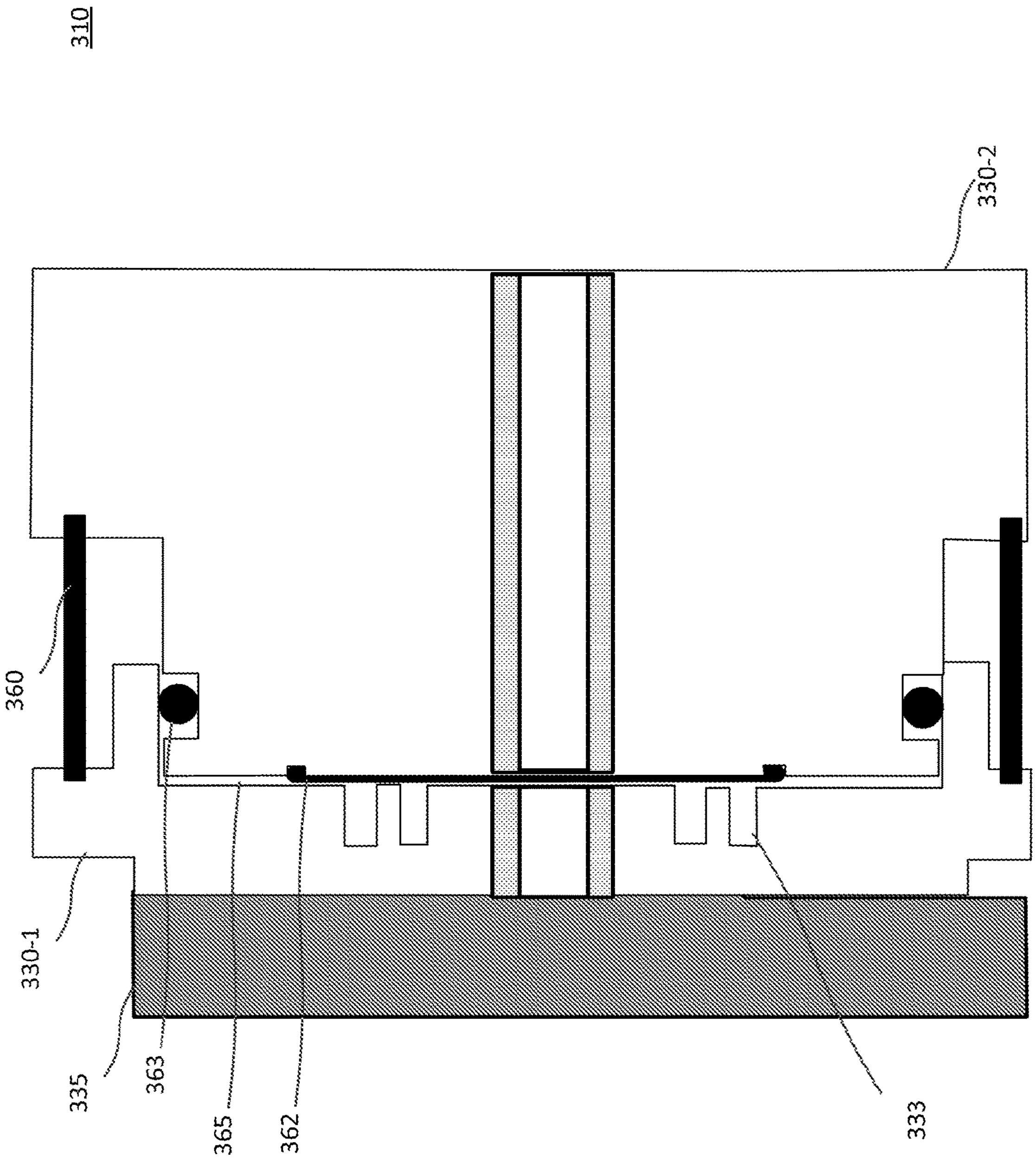
FIG. 5 is a side sectional view of a coaxial feed assembly of a microwave antenna system according to the present disclosure.

FIG. 5 is a side sectional view of a coaxial feed assembly 310 of a microwave antenna system according to the present disclosure, illustrating another example of a gap 365 forced between a first waveguide component 330-1 and a second waveguide component 330-2. The first waveguide component 330-1 may be coupled to the second waveguide component 330-2 via mounting elements 360, which may be screws, bolts, pins, or other mounting equipment. The mounting elements 360 may induce the gap 365. In some embodiments, a spring element 362 may be present to bias the first waveguide component 330-1 toward component 335. This spring element 362 may be, for example, an O-ring or spring washer. The spring element 362 may ensure that the gap 365 has a minimum spanning distance. In some embodiments, a sealing element 363 may be present to provide an environmental seal to the gap 365.

Figure 6A:
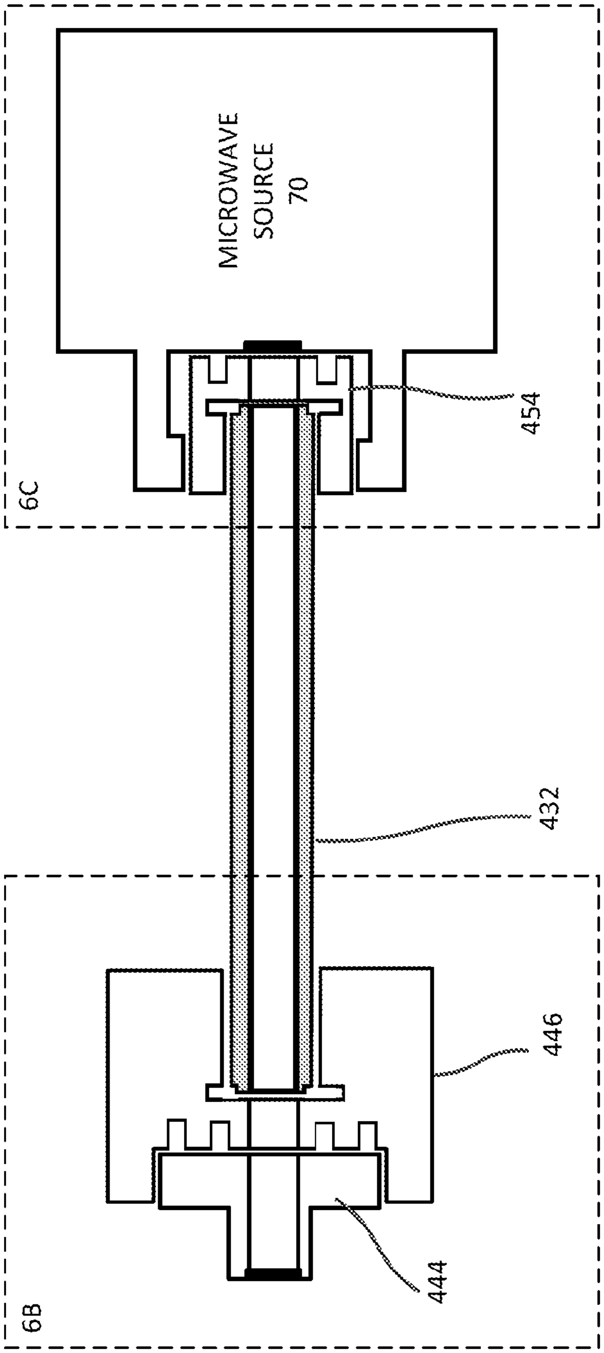
FIG. 6A is a side sectional view of a coaxial feed assembly of a microwave antenna system according to the present disclosure.
Figure 6B:
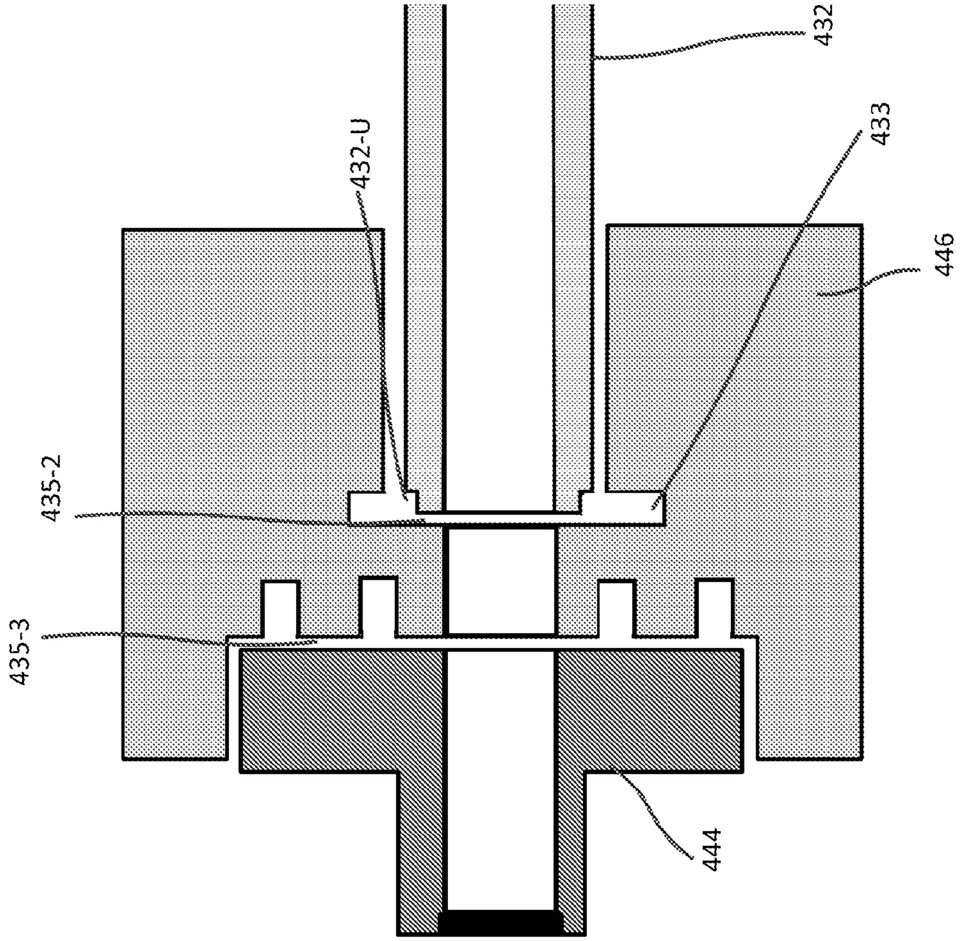
FIG. 6B is a side sectional view of a portion 6B of the coaxial feed assembly of FIG. 6A.
Figure 6C:
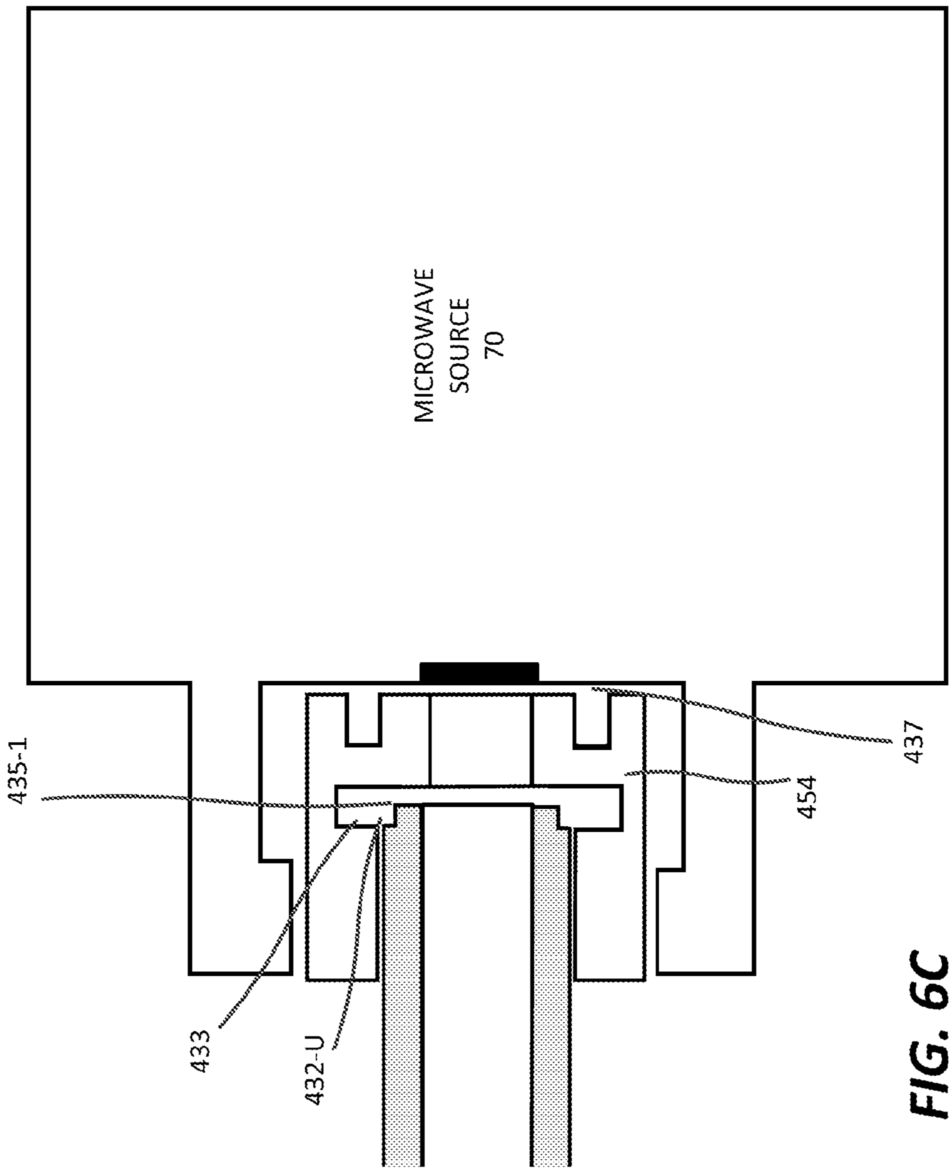
FIG. 6C is a side sectional view of a portion 6C of the coaxial feed assembly of FIG. 6A.

FIG. 6A is a side sectional view of a coaxial feed assembly of a microwave antenna system 410 according to the present disclosure, and FIGS. 6B and 6C are enlarged portions thereof. Referring to FIGS. 6A-C, the microwave antenna system 410 may include a microwave source 70, a source end transition element 454, a waveguide boom 432, a reflector end transition element 446, and a feed hub 444. The source end transition element 454 may be separated from the waveguide boom 432 by a first gap 435-1, the waveguide boom 432 may be separated from the reflector end transition element 446 by a second gap 435-2, and the reflector end transition element 446 may be separated from the feed hub 444 by a third gap 435-3. The first, second, and third gaps 435 may be forced via mechanical connections (e.g., mounting components not seen in FIGS. 6A-C) that are configured to couple the waveguide components on each side of each gap 435, such that a size of each gap 435 is selected to reduce a size of a gap 437 between the source end transition element 454 and the microwave source 70. The gap 437 may be an unavoidable gap resulting from installation requirements.

Each gap 435 and 437 may have one or more than one coaxial choke 433 present in either a first waveguide component on a first side of the gap 435 or 437 and/or in a second waveguide component on a second side of the gap 435 or 437. Each of the coaxial chokes 433 may be grooves having a size and a depth corresponding to the wavelength of a transmission frequency of the microwave antenna system. As can be seen in FIGS. 6B and 6C, in some embodiments, to reduce an overall radius or diameter of components (e.g., the source end transition element 454, the waveguide boom 432, the reflector end transition element 446, and the waveguide hub 444), the chokes 433 may extend such that a greatest length thereof is radially, e.g., perpendicular to the direction of microwave signal propagation, rather than parallel to the direction of microwave signal propagation. In some embodiments, the waveguide boom 432 may have undercut regions 432-U to realize the chokes 433.

In view of the above, the performance of the microwave antenna system 410, because a size of the gap 437 may be reduced due to the presence of gaps 435. Stated differently, by splitting up the gap 437 into multiple smaller gaps 435 throughout the coaxial feed assembly 410, RF signal performance may be improved.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated operations, elements, and/or components, but do not preclude the presence or addition of one or more other operations, elements, components, and/or groups thereof. As used herein, the term "and/or" includes any and all combinations of one or more of the associated listed items. Like reference numbers signify like elements throughout the description of the figures.

The thicknesses of elements in the drawings may be exaggerated for the sake of clarity. Further, it will be understood that when an element is referred to as being "on," "coupled to" or "connected to" another element, the element may be formed directly on, coupled to or connected to the other element, or there may be one or more intervening elements therebetween.

Terms such as "top," "bottom," "upper," "lower," "above," "below," and the like are used herein to describe the relative positions of elements or features. For example, when an upper part of a drawing is referred to as a "top" and a lower part of a drawing is referred to as a "bottom" for the sake of convenience, in practice, the "top" may also be called a "bottom" and the "bottom" may also be a "top" without departing from the teachings of the inventive concept.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A microwave antenna assembly, comprising:

a waveguide comprising a first waveguide component and a second waveguide component;

a mechanical connection configured to couple the first waveguide component and the second waveguide component and configured to force a first gap between the first waveguide component and the second waveguide component, wherein a spanning distance of the first gap is selected to reduce a size of a second gap due to tolerances within the microwave antenna assembly between the waveguide and radio equipment, the radio equipment configured to provide the waveguide with microwave radiofrequency (RF) signals.

2. The microwave antenna assembly of claim 1, wherein the second gap is associated with a coaxial RF choke.

3. The microwave antenna assembly of claim 2, wherein the first waveguide component comprises the coaxial RF choke.

4. The microwave antenna assembly of claim 1, further comprising a waveguide transition coupled between the first waveguide component and the radio equipment, wherein the second gap is between the waveguide transition and the radio equipment.

5. The microwave antenna assembly of claim 1, further comprising a spring element configured to bias the second waveguide component toward a component of the microwave antenna assembly other than the first waveguide component.

6. The microwave antenna assembly of claim 5, wherein the spring element is an O-ring.

7. The microwave antenna assembly of claim 1, further comprising a parabolic reflector antenna coupled to a waveguide.

8. The microwave antenna assembly of claim 1, wherein the first waveguide component or the second waveguide component comprises an undercut region in an end thereof.

9. The microwave antenna assembly of claim 8, wherein the undercut region forms an RF choke.

10. A method of providing a microwave antenna assembly, the method comprising:

providing a waveguide arrangeable between a microwave antenna and radio equipment configured to provide signals to the microwave antenna, the waveguide comprising first waveguide component and a second waveguide component with a forced first gap therebetween, the forced first gap having a spanning distance, wherein the spanning distance of the forced first gap is selected to reduce a size of a second gap between the second waveguide component and the radio equipment, the second gap resulting in part from tolerances within a microwave antenna assembly.

11. The method of claim 10, further comprising providing a coaxial RF choke at the second gap.

12. The method of claim 11, wherein the first waveguide component comprises the coaxial RF choke.

13. The method of claim 10, further comprising providing a waveguide transition arrangeable between the first waveguide component and the radio equipment, wherein the second gap is between the waveguide transition and the radio equipment.

14. The method of claim 13, further comprising providing a spring element configured to bias the second waveguide component toward a component of the microwave antenna assembly other than the first waveguide component.

15. A method comprising:

providing a plurality of waveguide components that form a waveguide between an antenna and radio equipment, each waveguide component having a tolerance associated therewith, the tolerances summing to a total tolerance stack; and forcing, via a mechanical connection, a gap between first and second waveguide components of the plurality of waveguide components, wherein a location and a spanning distance of the gap are selected to divide the total tolerance stack into a first tolerance stack and a second tolerance stack.

16. A microwave antenna assembly comprising:

a waveguide coupled to radio equipment, the waveguide comprising a first waveguide component and a second waveguide component;

a first gap between the first waveguide component and the second waveguide component; and a first radiofrequency (RF) choke concentric with the first gap, wherein a spanning distance of the first gap is selected to reduce a size of a second gap due to tolerances within the microwave antenna assembly in a direction of signal propagation.

17. The microwave antenna assembly of claim 16, wherein the first waveguide component comprises the first RF choke.

18. The microwave antenna assembly of claim 16, further comprising a waveguide transition coupled between the first waveguide component and the radio equipment, wherein the second gap is between the waveguide transition and the radio equipment.

19. The microwave antenna assembly of claim 16, further comprising a spring element configured to bias the second waveguide component toward a component of the microwave antenna assembly other than the first waveguide component.

20. The microwave antenna assembly of claim 16, further comprising a second RF choke at an undercut region formed in an end of the first waveguide component or in an end of the second waveguide component.

21. A microwave antenna assembly comprising:

a waveguide boom coupled to radio equipment;

a first gap between the waveguide boom and a waveguide component different than the waveguide boom; and a first radiofrequency (RF) choke concentric with the first gap, the first RF choke at an undercut region formed in an end of the waveguide boom.

* * * * *